(12) United States Patent
Nolan et al.

(10) Patent No.: US 7,761,906 B1
(45) Date of Patent: Jul. 20, 2010

(54) METHOD AND APPARATUS FOR SPATIALLY STATIONARY SOFTWARE ON MOBILE HARDWARE

(75) Inventors: John S. Nolan, Ayrshire (GB); Robert F. Tow, Los Gatos, CA (US); Randall B. Smith, Palo Alto, CA (US)

(73) Assignee: Oracle Corporation, Redwood City, CA (US)

( * ) Notice: Subject to any disclaimer, the term of this patent is extended or adjusted under 35 U.S.C. 154(b) by 1107 days.

(21) Appl. No.: 11/111,392

(22) Filed: Apr. 21, 2005

(51) Int. Cl.
G06F 7/04 (2006.01)
(52) U.S. Cl. .................................. 726/3; 726/2; 726/4
(58) Field of Classification Search ........................ None
See application file for complete search history.

(56) References Cited

U.S. PATENT DOCUMENTS

| | | | | |
|---|---|---|---|---|
| 5,850,517 | A * | 12/1998 | Verkler et al. ............... | 709/202 |
| 7,065,783 | B2 * | 6/2006 | Rygaard ...................... | 726/4 |
| 7,130,622 | B2 * | 10/2006 | Vanska et al. ............... | 455/419 |
| 7,143,441 | B2 * | 11/2006 | Rygaard ...................... | 726/22 |
| 7,305,679 | B2 * | 12/2007 | Kovacs et al. ............... | 719/313 |
| 2001/0032232 | A1 * | 10/2001 | Zombek et al. ............. | 709/201 |
| 2005/0223222 | A1 * | 10/2005 | Graves et al. ............... | 713/165 |

FOREIGN PATENT DOCUMENTS

EP 1067457 * 10/2001

OTHER PUBLICATIONS

Nguyen (Douglas N. Nguyen and David Holter, "NT/Windows 2000 User Profile Issues", SIGUSCCS Oct. 2001, ACM 1-58113-382-0/01/0010).*
SPOT (Donald Thompson, Smart Personal Object Technology (SPOT), Oct. 2004 Dotnet.sys-con.com).*
Stallings (William Stallings, "Cryptography and Network Security. Principles and Practice", 3rd Edition, ISBN0130914290, 2003), p. 384-428.*
Jansen et al., "A framework for Multi-mode Authentication: Overview and Implementation Guide", Computer Security Division Information Technology Laboratory NIST, Aug. 2003, Ad Astra Engineering, Incorporated, "Jumping Beans", Dec. 3, 1998.*
Ad Astra Engineering, Incorporated, "Jumping Beans", Dec. 3, 1998.*
Webster ("Merriam-Webster's Collegiate Dictionary", 10th Edition, ISBN 0877797080, 1997), p. 746.*

* cited by examiner

Primary Examiner—Kambiz Zand
Assistant Examiner—Peter Poltorak
(74) Attorney, Agent, or Firm—Osha • Liang LLP

(57) ABSTRACT

A method, involving placing code on a first device, wherein the code is associated with a code position, accessing properties associated with a second device, wherein the second device is detected by the first device, and transferring the code to the second device, if criteria based on a current position and properties of the second device, and the code position are met.

17 Claims, 4 Drawing Sheets

METHOD AND APPARATUS FOR SPATIALLY STATIONARY SOFTWARE ON MOBILE HARDWARE

BACKGROUND

With the advent of mobile computing resources, it is often the case that hardware platforms (e.g., mobile telephones, wearable wirelessly networked computers, automobile telematics, etc.) pass through a location of interest and subsequently leave the location, making the task of continuously monitoring these hardware platforms at a particular location or position difficult. Moreover, the task of replacing hardware platforms becomes tedious when particular software is tied to the hardware platform. Consider the task of replacing a software-driven doorbell system based on software manipulation that unlocks the door to a house or office. Specifically, suppose the software-driven doorbell system includes a wireless networked computer that controls the doorbell and door lock, and contains a set of rules for access control. For example, the set of rules may include a list of wearable wireless computers that are recognized and have the result of unlocking the door. When the doorbell button is replaced, the new doorbell button is placed in the same spatial location and is explicitly re-programmed to include the control software and access control list from the previous doorbell button.

Typically, in order to continuously monitor hardware platforms at a particular location, reports from a variety of sensor platforms carrying equivalent software are collected. Subsequently, the location of each sensor platforms is correlated in a central server, and a set of readings corresponding to one location from sensor platforms passing through a location is derived. Then, commands can be communicated to specific platforms currently at the location of interest. Information located in multiple sensor platforms is not designed to be gathered easily or be associated with a particular position regardless of the presence of a hardware device (e.g., sensor, doorbell, etc.).

SUMMARY

In general, in one aspect, the invention relates to a method, comprising placing code on a first device, wherein the code is associated with a code position, accessing properties associated with a second device, wherein the second device is detected by the first device, and transferring the code to the second device, if criteria based on a current position and properties of the second device, and the code position are met.

In general, in one aspect, the invention relates to a system, comprising a first device comprising code associated with a position, and a second device, wherein the second device is detected by the first device and is configured to receive the code, if criteria based on a current position and properties of the second device, and the code position are met.

Other aspects of the invention will be apparent from the following description and the appended claims.

DETAILED DESCRIPTION

Figure 1A:
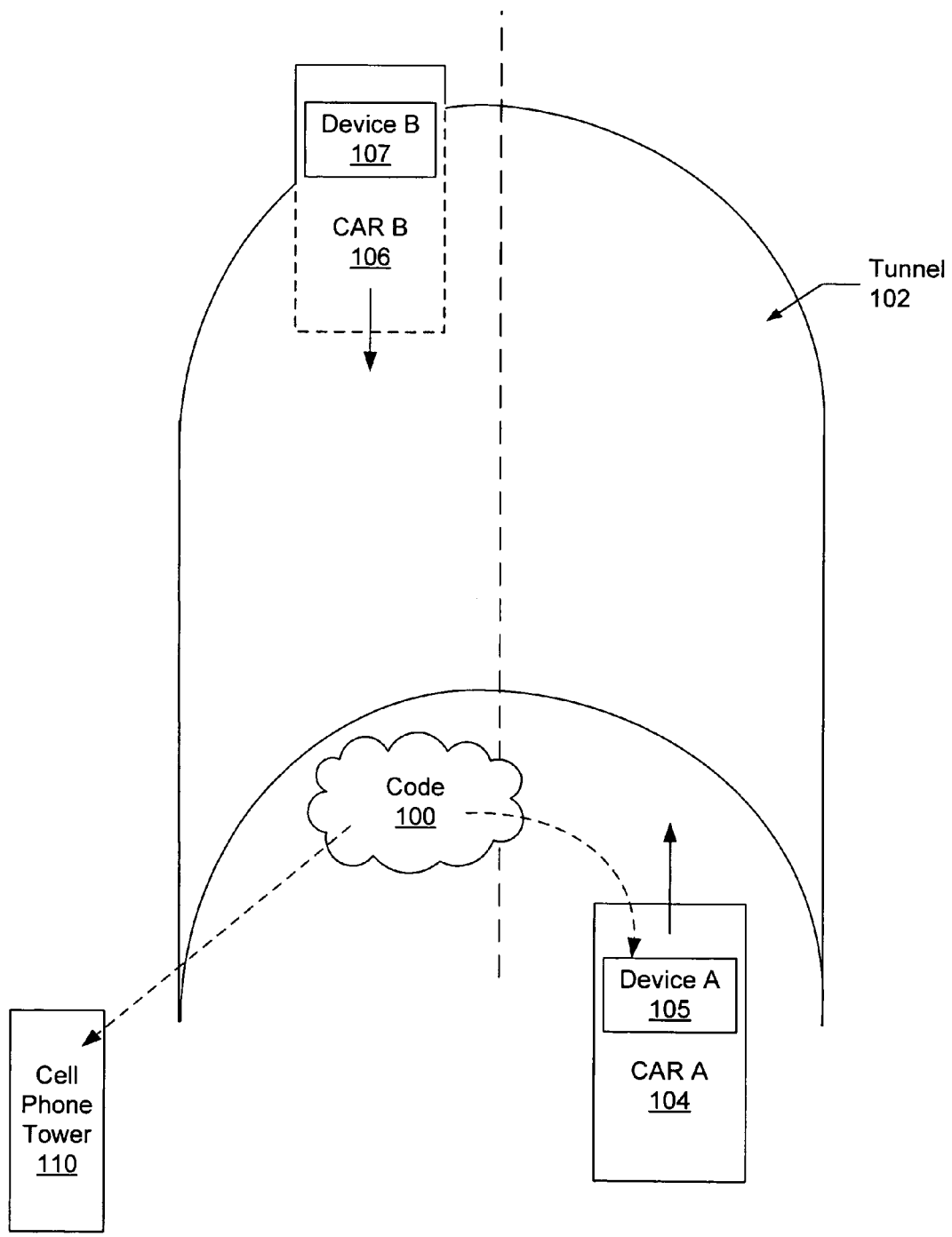
FIGS. 1A and 1B show a system involving spatially resident software in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to spatially stationary code that tries to remain located at a particular position, while providing functionality to different hardware platforms that pass through the position where the code is located. Specifically, embodiments of the invention relate to code that includes functionality to be aware of its current position, so that the code may transfer itself to one or more hardware platforms (i.e., devices) in the direction of the particular position with which the code is associated.

Figure 1B:
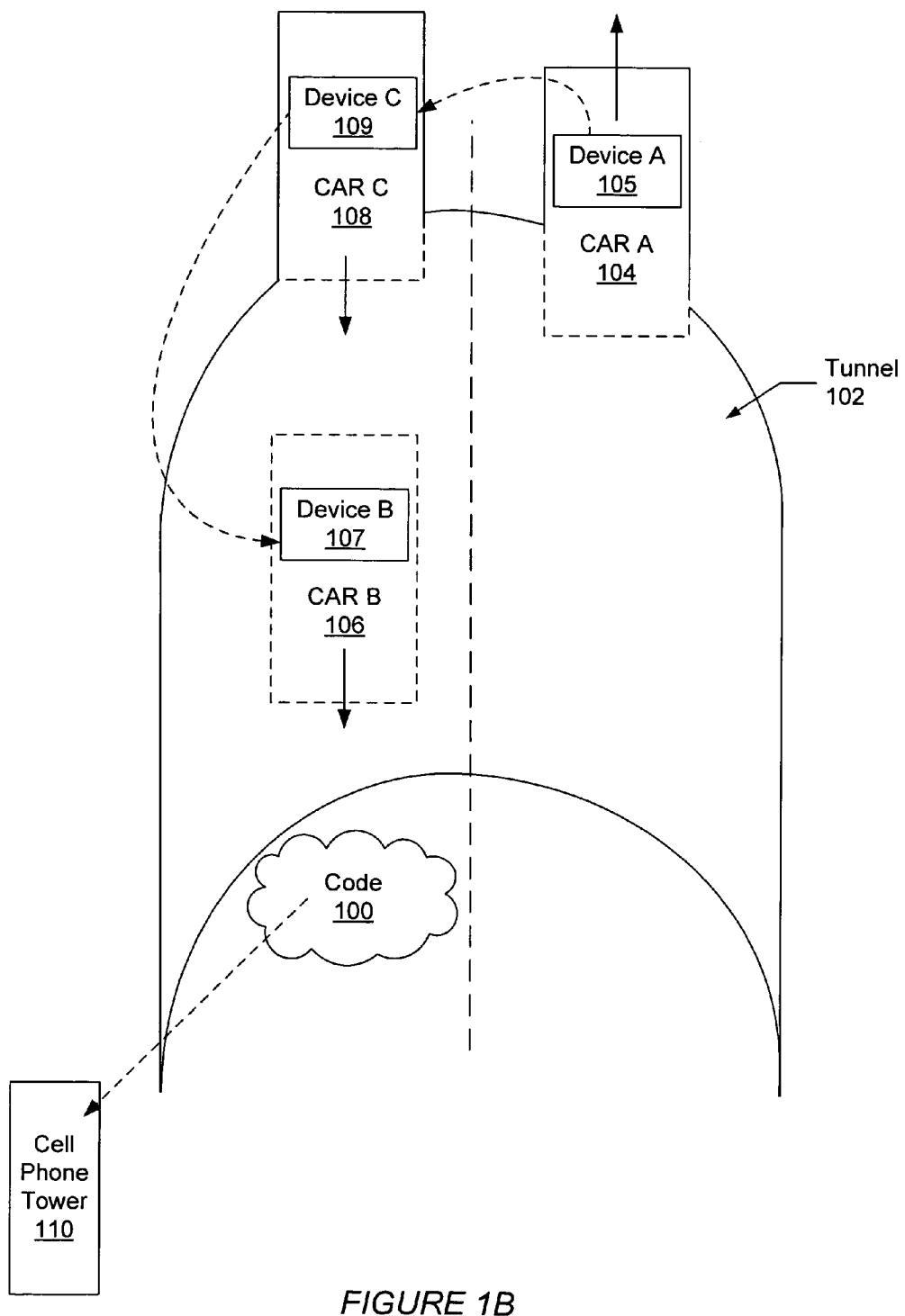

FIGS. 1A and 1B show an example system for spatially resident code in accordance with one embodiment of the invention. The system of FIG. 1A includes code (100) associated with a position. Specifically, in this example, the code is positioned at the mouth of a tunnel (102) through which cars (i.e., Car A (104), Car B (106) may pass through. In one embodiment of the invention, each car (104, 106) is shown to include devices (i.e., Device A (105), Device B (107)), such as cell phones, onto which the code (100) may be downloaded to provide functionality to the devices. For example, if the devices are cell phones, then the cell phone functionality may be limited by the cell phone tower (110). In this case, the code (100) may provide the ability for users to continue using the cell phone while in the tunnel (102), where the cell phone tower (110) signal ordinarily does not operate.

In one embodiment of the invention, the code (100) attempts to reside at the position associated with the code (100) (or, in other words, at a code position). In FIG. 1A, the code (100) is associated with the position represented by the mouth of the tunnel (102). Thus, the code (100) endeavors to stay at the mouth of the tunnel (102), while providing functionality to devices (i.e., Device A (105), Device B (107)) that pass through and around the tunnel (102). In one embodiment of the invention, code (100) may be any software, application, etc., (or any portion thereof) that provides functionality to a device. For FIG. 1A, the code (100) may be router software that maintains itself at the mouth of the tunnel (102) on a cell phone hand set and communicates with both the cell phone tower (110) and neighboring cell phones communicating with the cell phone tower (110), forming an ad-hoc mesh network. Further, in one embodiment of the invention, code (100) may also be any software that waits for an event to occur, monitors an event, etc. For example, code (100) may be resident near the doorway of a classroom to monitor the temperature of the classroom, resident near a traffic signal to report violators of speed limits, resident in a doorbell system to provide locking/unlocking functionality of a door, etc.

Those skilled in the art will appreciate that the code may be associated with various positions depending on the type of functionality that the code provides to different devices that travel in and out of the position. Further, in one embodiment of the invention, the code may be associated with more than one position. In one embodiment of the invention, a position or location may be a physical location (e.g., GPS coordinates) or a location within a network (e.g., a star network topology, an ad-hoc network, a cluster network, a mesh network, etc.), where the code resides on a particular node of the network or the nodes of a network topology. Those skilled in the art will appreciate that the term network may include dynamically configured networks that allow elements to be transient.

Continuing with FIG. 1A, in accordance with one embodiment of the invention, when a car enters the tunnel (102), the code (100) resident at the mouth of the tunnel (102) "jumps" to the device (e.g., a cell phone) within the car and provides functionality to the device, e.g., so that a user may talk on the cell phone, while the car is passing through the tunnel (102). In this case, the code (100) may include special routing software that communicates with both the cell phone tower (110) and the device in the car. For example, suppose the code (100) "jumps" to Car A (104) in FIG. 1A, where Car A (104) is entering the mouth of the tunnel (102). In this case, the code (100) downloads itself onto Device A (105) and communicates with the cell phone tower (110) from Device A (105). Those skilled in the art will appreciate that the code (100) may clone (i.e., copy) itself (or a portion of itself) onto Device A (105) such that the original copy of the code (100) remains at the cell phone tower (110). Alternatively, in one embodiment of the invention, only one copy of the code (100) may exist, in which case the code (100) downloads itself onto one or more devices that pass in and around the tunnel (102). In this case, the code (100) may reside at the cell phone tower (110) when no cars including devices are present near the mouth of the tunnel (102).

The code (100) transfers to Device A (105) within Car A (104) via a communication channel. The communication channel may be any electromagnetic energy means (e.g., infrared, radio frequency, light, etc.), a magnetic field, cables, acoustics, etc. Further in one embodiment of the invention, the code may use routing tables containing the address of one or more devices to detect and download onto the devices. Those skilled in the art will appreciate that when the code (100) "jumps" to a particular device or hardware platform, the code (100) carries its complete instantaneous state. Thus, re-initialization of the code (100) for each new device that passes through the tunnel (102) is not necessary. Further, those skilled in the art will appreciate that the device at the mouth of the tunnel and other devices passing in and out of the code position may be part of a network (e.g., a mesh network, where the devices can detect and identify each other by direct communication).

In one embodiment of the invention, the code (100) includes functionality to determine its location relative to the position with which the code (100) is associated (i.e., the mouth of the tunnel (102)). In one embodiment of the invention, the code (100) may use radio strength, GPS coordinates, etc., to determine the direction in which the code (100) is moving relative to the position with which the code (100) is associated.

In one embodiment of the invention, the code (100) attempts to return to the position with which the code (100) is associated (i.e., the code position) once the current hardware platform that the code (100) is transferred onto leaves the proximity of the code position. For example, as shown in the system of FIG. 1B, when Car A (104) leaves the tunnel (102), the code (100) includes functionality to know that the code (100) is moving away from the mouth of the tunnel (102) and searches for another device to "jump" to that is traveling in a direction closer to the mouth of the tunnel (102). As shown in FIG. 1B, Car C (108) is entering the tunnel (102) as Car A (104) is exiting, providing the code (100) with a device (i.e., Device C (109)) to "jump" to in order to travel back towards the direction of the mouth of the tunnel (102). Subsequently, the code (100) may download itself onto Device B (107) in Car B (106) to get even closer to the mouth of the tunnel (102). Alternatively, the code (100) may simply wait until Car C (108) leaves the tunnel (102) and subsequently transfer to the device at the mouth of the tunnel (102) (if one exists), to another car entering the tunnel (102), or to the cell phone tower (110). Further, although not shown in FIG. 1B, if another car enters the tunnel (102) behind Car A (104), then the code (100) may "jump" onto the device within the subsequent car, such that the code (100) travels backward through the tunnel (102) to return to the mouth of the tunnel (102). In one embodiment of the invention, before transferring itself to another device, the code (100) may access properties associated with the hardware platform to determine whether the hardware platform meet particular criteria for the code (100) to transfer itself to the hardware platform (discussed below in FIGS. 2 and 3).

In one embodiment of the invention, if a hardware platform does not exist near the mouth of the tunnel (102), the then code (100) may reside at the cell phone tower (110) and "rubber bands" (i.e., transfers itself) back to the mouth of the tunnel (102) when a car including a device appears near the mouth of the tunnel (102). Those skilled in the art will appreciate that although FIGS. 1A and 1B show a cell phone tower (110) at which the code (100) originates, the code (100) may simply be programmed to reside near the mouth of the tunnel (102), where the code (100) "jumps" from device to device, without residing at a cell phone tower when no cars/devices are in the vicinity of the tunnel (102). Thus, although the code (100) may be communicating with the cell phone tower (110), the code (100) may not use the cell phone tower (110) as a "home base." Instead, the code (100) may download itself onto a particular device within a car, and each time the code (100) is carried away from the mouth of the tunnel (102) by a device, the code (100) may make its way back to the position at the mouth of the tunnel (102) by constantly searching for devices moving toward the code position. Thus, the code (100) may constantly download itself from one device to another in an attempt to remain resident at or near the code position (e.g., the mouth of the tunnel (102) shown in FIGS. 1A and 1B), effectively hitchhiking toward the mouth of the tunnel (102). Further, as noted above, the code (100) may be resident on a device (i.e., a wireless network computer, a hand set, etc.) at the mouth of the tunnel (102).

Figure 2:
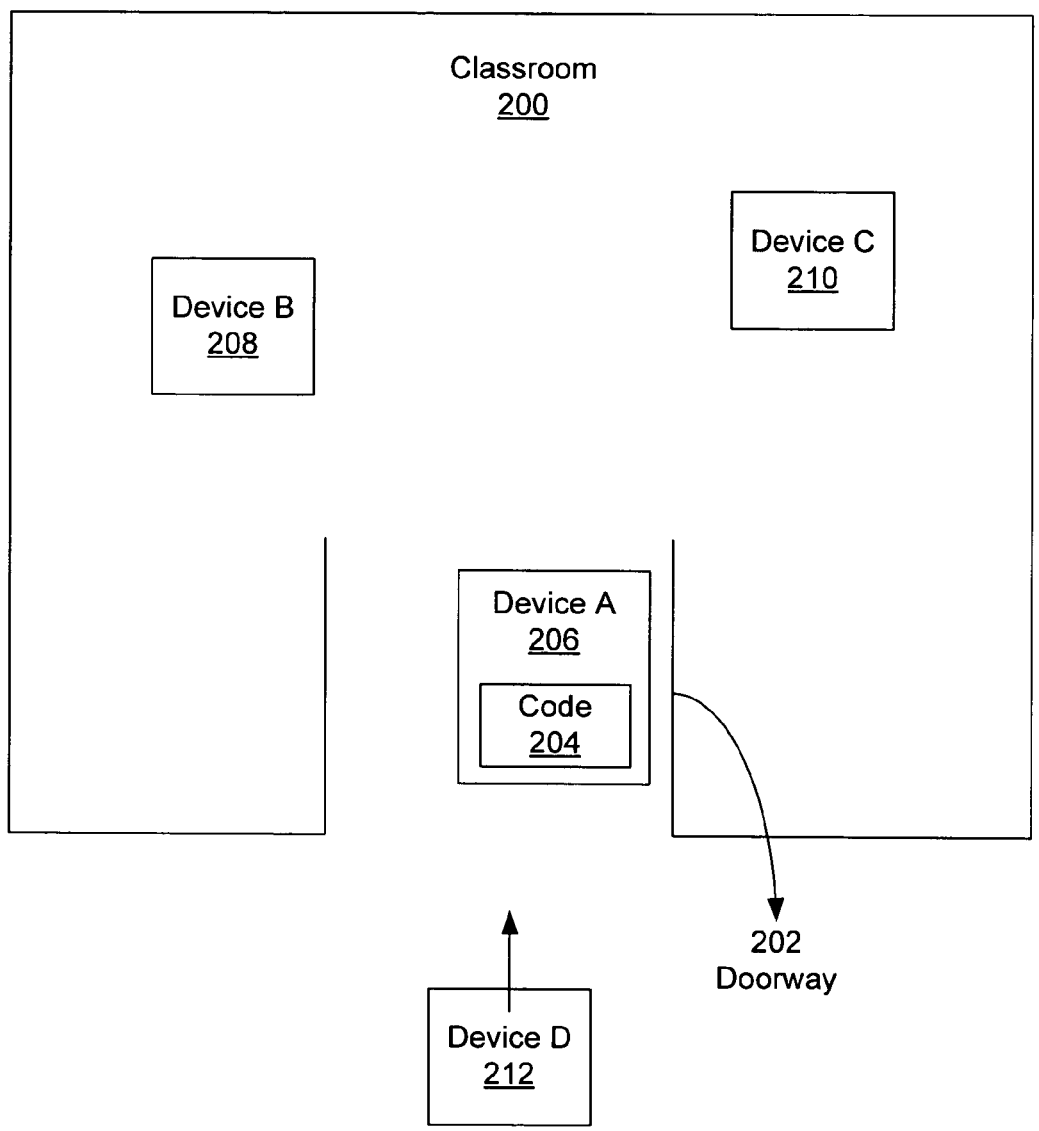
FIG. 2 shows a system involving spatially resident software in accordance with one embodiment of the invention.

FIG. 2 shows a system of spatially resident software in accordance with one embodiment of the invention. FIG. 2 shows a classroom (200) including a doorway (202), code (204) on a device (i.e., Device A (206)), where the code (204) is associated with the doorway (202) (i.e., attempts to remain resident at the doorway (202) of the classroom (200)), and several other devices (i.e., Device B (208, Device C (210), Device D (212)) entering and leaving the classroom (200). Those skilled in the art will appreciate that the devices shown in FIG. 2 may be any device capable of storing code, such as calculators, wireless computers, personal digital assistants, etc. Further, those skilled in the art will appreciate that although the code (204) that associated with doorway (202) is shown in FIG. 2 as residing on Device A (206), the code (204) may or may not reside on a device. Rather, in one embodiment of the invention, the code (204) may attempt to reside at or as close to the doorway (202) as possible, with or without having a physical device placed at the doorway (202).

As described above, the code (204) attempts to stay at a position near the doorway (202) of the classroom (200) in order to provide functionality to the devices that enter the classroom (200). For the purposes of the classroom (200) shown in FIG. 2, suppose that each of the devices within the classroom (200) or entering the classroom (200) (i.e., Device B (208), Device C (210), and Device D (212)) are calculators that belong to users (e.g., students, teachers, etc.) in the classroom (200). In this case, the code (204) resident at the doorway (202) copies itself (or a portion of itself) and downloads onto one or more calculators when the calculators are detected as entering the classroom (200). Further, in one embodiment of the invention, the code (204) may copy and download only portions of the code (204), based on the types of functionalities provided to each student or the teacher in the classroom (200). For example, suppose that a statistics class uses the classroom (200) in the morning and a physics class is present in the classroom (200) during the afternoon. In this case, the code (204) may determine the time of day and download appropriate functionalities based on which class is scheduled to use the classroom (200). In other words, the code may provide an allowed software package specific to a class based on the time of day, the day of the week, etc. Specifically, if a physics class is present in the classroom (200) on the day of an examination, then the calculators used by students may not be permitted to have physics formulas. In this case, the software package that is downloaded to the calculators during the physics class may include all functionalities except physics formulas.

In FIG. 2, Device B (208) and Device C (210) include the downloaded code (204). Device D (212), however, is entering the classroom (200). When Device D (212) is detected by the code (204), the code (204) may access the properties associated with Device D (212) to determine whether Device D (212) is entering the classroom (200) (e.g., the direction and velocity of Device D (212)), whether Device D (212) is capable of storing the code (204) (e.g., whether Device D (212) has enough memory to load the code (204), etc.), whether Device D (212) is a valid calculator type authorized for use in the class, etc. Upon accessing the properties associated with Device D (212), the code (204) downloads to Device D (212) if the criteria for the download of the code (204) are met. For example, if Device D (212) does not have enough memory to load the code (204), then one of the criterion for the download is not met, and the code (204) does not download onto Device D (212).

In one embodiment of the invention, the code (204) may access user properties associated with the devices that enter the classroom (200) to determine whether the device is suitable for the download of the code (204). For example, in FIG. 2, if a particular calculator belongs to a teacher, then the code (204) may access the device to determine that the calculator is authorized for use by a teacher, authenticate the teacher, and download itself, including all its functionalities, to the calculator. Those skilled in the art will appreciate that authentication of the user (e.g., teacher, student, principal, etc.) may be performed using any authentication means well known in the art (e.g., username and password authentication, digital signatures, biometric authentication, etc.). Alternatively, if the calculator belongs to a student, and the student is authenticated, then the code (204) may access user properties and determine that the student is enrolled in both a physics class and a statistics class, in which case the code (204) may download only the functionalities allowed in both the physics and statistics class depending on the location of the device and time of day (e.g., located in a particular classroom at a particular time with the user being authenticated as a particular student).

Those skilled in the art will appreciate that although the examples provided in FIGS. 1A, 1B, and 2 relate to a tunnel and a classroom environment, respectively, embodiments of the invention are similarly applicable to other environments, such as a doorbell system of a house, a traffic signal, automobile telematics, chemical reactor, pallets in an inventory system, environmental monitoring in a river, human or animal body monitoring, etc. Thus, the example systems shown in FIGS. 1A, 1B, and 2 are not meant to limit the invention in any way.

Figure 3:
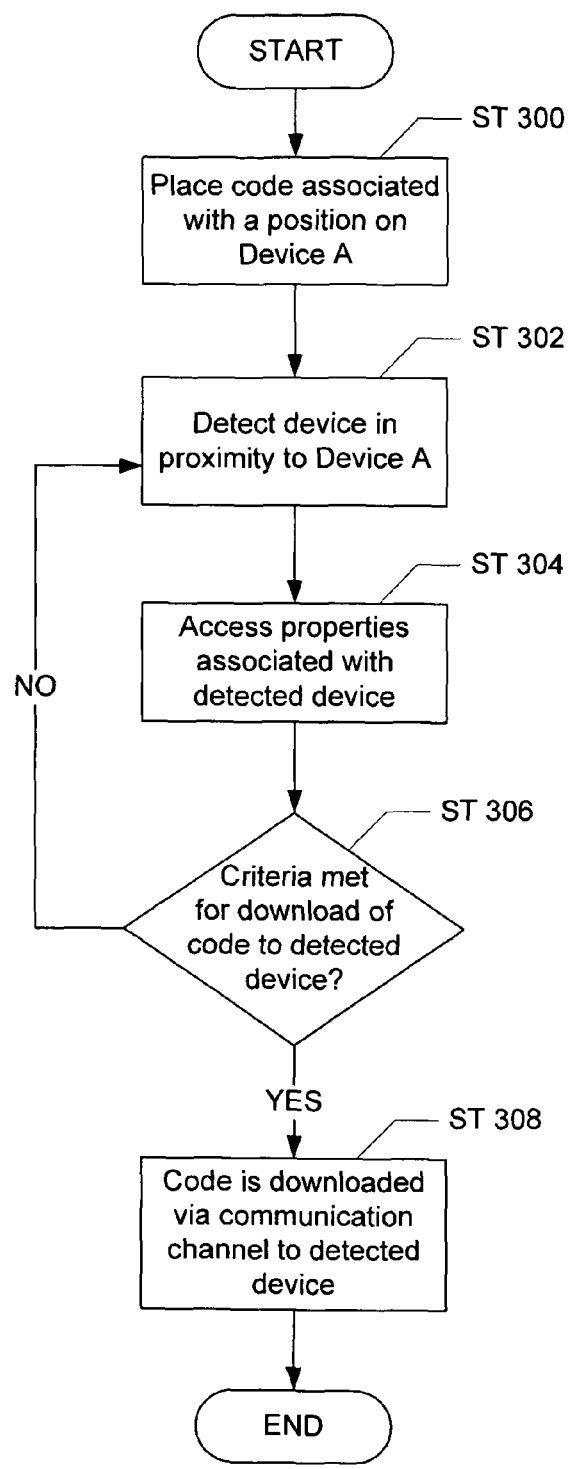
FIG. 3 shows a flow chart for using spatially resident software in accordance with one embodiment of the invention.

FIG. 3 shows a flow chart for spatially resident code in accordance with one embodiment of the invention. Those skilled in the art will appreciate that the code may initially be placed on a hardware platform that is not near the position associated with the code. For example, the code may be downloaded from a computing system in a user's office, but the code may be associated with a position outside a classroom door in a school, a doorbell outside of a house, the mouth of a tunnel, etc. Further, as described above, the position may be a physical location or a location represented by a network node. For example, in a star topology of a cluster network, the associated position(s) of the code may be the nodes that form the star topology.

The process shown in FIG. 3 begins with placing code associated with a particular position on Device A (Step 300). Those skilled in the art will appreciate that Device A may be any device capable of storing code (e.g., a wireless computer, a mobile phone, a PDA, etc.). Further, Device A may or may not be near the position associated with the code. Subsequently, another device near Device A is detected by the code (Step 302). In one embodiment of the invention, a device may be detected using a method of identification, such as using a magnetic field, determining a device ID by reading an RFID tag, the strength of a radio frequency, etc. When Device B is detected near Device A, the code accesses the properties associated with Device B (Step 304). In one embodiment of the invention, properties associated with Device B may be the position of Device B relative to the position associated with the code, available resources of Device B, permissions associated with Device B, the velocity of Device B, user properties of Device B, etc.

Upon accessing the properties associated with Device B, the code determines whether the criteria for the transfer of the code to Device B are met (Step 306). In one embodiment of the invention, the criteria for the transfer of the code to Device B may be associated with whether or not Device B allows the code to move in the direction of the code position (e.g., the position associated with the code, the spatial position at which the code resides). For example, in the tunnel system of FIGS. 1A and 1B, the criteria used to determine whether the code should transfer from one hardware platform (i.e., device) to another are associated with whether the transfer of the code allows the code to move toward the mouth of the tunnel, which is the position associated with the code. Alternatively, in the classroom system of FIG. 2, the criteria for the transfer of the code to Device B may be associated with whether or not a particular calculator is authorized to include the code (e.g., does the calculator belong to a student enrolled in the class, does the calculator belong to a teacher teaching the class, etc.), whether the time of day is correct for the download of code for a particular class (e.g., is the current time the time scheduled for a physics class, etc.), etc.

Continuing with FIG. 3, if the criteria are met for the transfer of the code to Device B, then the code is downloaded via a communication channel to Device B (Step 308). As described above, the communication channel may be an electromagnetic energy channel, a magnetic field, acoustics, cables, etc. Those skilled in the art will appreciate that the code may copy itself and download the copy onto Device B, or only one copy of the code may exist, in which case the code transfers itself to Device B. Further, portions of code may be downloaded onto a device (e.g., the portion specific to an authenticated user of the device, a portion to provide specific functionality to the device, etc.). In one embodiment of the invention, the code may be securely downloaded using encryption. In this case, the encryption/decryption keys may be located on a device, and the code downloads to the device only if the keys are present to decrypt the content of the code.

Alternatively, if the criteria is not met for the transfer of the code to Device B, then the process returns to Step 302, where the code searches for another detected device to download itself onto. If another detected device is found, then Steps 304-306 are repeated. When the position associated with the code is reached (not shown), the code attempts to stay resident at or near the associated position, while several devices move in and around the code position onto which the code may or may not download itself, depending on the functionality that the code provides. Those skilled in the art will appreciate that the process shown in FIG. 3 may be repeated each time a detected device is found near the code position that allows the code to either provide functionality to the detected device, or return to the code position, if the code has traveled away from the position.

Embodiments of the invention provide a "standing wave" of software at a given spatial position, while device platforms flow through and around the position. One or more embodiments of the invention eliminate the need for a central server or control for sensing a given position with devices such as mobile hardware platforms. Further, embodiments of the invention provide allow moving software into replacement hardware easier by allowing the software to remain resident at the position associated with the hardware and not within the hardware itself.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   placing code associated with a code position onto a first physical mobile device when a functionality provided by the code is required by the first physical mobile device, wherein the code position is a physical location defined by a set of geographical coordinates;
   detecting, using the first physical mobile device, a second physical mobile device within a range of the first physical mobile device;
   obtaining properties associated with the second physical mobile device;
   calculating, using the first physical mobile device and the code, a first distance between the first physical mobile device and the physical location;
   calculating, using the first physical mobile device and the code, a second distance between the second physical mobile device and the physical location; and
   authenticating, in response to the first distance exceeding the second distance, a user associated with the second physical mobile device based on the properties;
   transferring after authenticating, the code to the second physical mobile device from the first physical mobile device after the functionality provided by the code is no longer required by the first physical mobile device, wherein the functionality provided by the code is required by the second physical mobile device.

2. The method of claim 1, further comprising:
   identifying the second physical mobile device using a method of identification.

3. The method of claim 2, wherein the first physical mobile device and the second physical mobile device are components of a network.

4. The method of claim 1, wherein the code is transferred to the second physical mobile device via a communication channel.

5. The method of claim 4, wherein the communication channel is one selected from the group consisting of electromagnetic energy, cables, acoustics, and a magnetic field.

6. The method of claim 4, wherein the code is transferred from the first physical mobile device to the second physical mobile device in an attempt to return to the code position.

7. The method of claim 1, wherein the properties associated with the second physical mobile device comprise at least one selected from the group consisting of the second physical mobile device's position relative to the code position, available resources, permissions, velocity, and user properties.

8. The method of claim 1, wherein the code resides on a third physical device located at the code position.

9. The method of claim 8, wherein the code resides on a nearest device if the third physical device is unavailable at the code position, and returns to the third physical device when the third physical device is available at the code position.

10. A system comprising:
    a first physical mobile device configured to:
    download code associated with a code position when a functionality provided by the code is required by the first physical mobile device,
    wherein the code position is a physical location defined by a set of geographical coordinates;
    detect a second physical mobile device within a range of the first physical mobile device;
    obtain properties associated with the second physical mobile device;
    calculate, using the code, a first distance between the first physical mobile device and the physical location;
    calculate, using the code, a second distance between the second physical mobile device and the physical location;
    authenticate, in response to the first distance exceeding the second distance, a user associated with the second physical mobile device based on the properties; and
    transfer, after authenticating, the code from the first physical mobile device to the second physical mobile device after the functionality provided by the code is no longer required by the first physical mobile device; and
    the second physical mobile device configured to:
    receive, after authenticating the user, the code from the first physical mobile device wherein the functionality provided by the code is required by the second physical mobile device.

11. The system of claim 10, wherein the properties of the second physical mobile device comprise at least one selected from the group consisting of the second physical mobile device's position relative to the code position, available resources, permissions, velocity, and user properties.

12. The system of claim 10, wherein the first physical mobile device and the second physical mobile device are components of a network.

13. The system of claim 10, wherein the second physical mobile device receives code via a communication channel.

14. The system of claim 13, wherein the communication channel is one selected from the group consisting of electromagnetic energy, cables, acoustics, and a magnetic field.

15. The system of claim 13, wherein the code is transferred from the first device to the second physical mobile device in an attempt to return to the code position.

16. The system of claim 10, wherein the code resides on a third physical device located at the code position.

17. The system of claim 16, wherein the code resides on a nearest device if the third physical device is unavailable at the code position, and returns to the third physical device when the third physical device is available at the code position.

* * * * *